(12) United States Patent
Zhao (10) Patent No.: US 11,231,916 B2
(45) Date of Patent: Jan. 25, 2022

(54) METHOD AND APPARATUS FOR DATA COMPILATION USING INTERMEDIATE CLASS FILES, ELECTRONIC DEVICE AND NON-TRANSITORY COMPUTER READABLE STORAGE MEDIUM

(71) Applicant: Beijing Elex Technology Co., Ltd., Beijing (CN)

(72) Inventor: Xiaolong Zhao, Beijing (CN)

(73) Assignee: BEIJING ELEX TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/649,503

(22) PCT Filed: Aug. 21, 2018

(86) PCT No.: PCT/CN2018/101463
§ 371 (c)(1),
(2) Date: Mar. 20, 2020

(87) PCT Pub. No.: WO2019/148816
PCT Pub. Date: Aug. 8, 2019

(65) Prior Publication Data
US 2020/0249922 A1    Aug. 6, 2020

(30) Foreign Application Priority Data
Feb. 5, 2018    (CN) .......................... 201810113382.7

(51) Int. Cl.
*G06F 8/41*    (2018.01)
(52) U.S. Cl.
CPC ...................................... *G06F 8/41* (2013.01)

(58) Field of Classification Search
CPC ......... G06F 8/41; G06F 8/4435; G06F 8/4441
(Continued)

(56) References Cited

U.S. PATENT DOCUMENTS 6,804,682 B1 * 10/2004 Kemper .................... G06F 8/72
7,080,370 B1 *  7/2006 Crowl ...................... G06F 8/41
                                                            717/163

(Continued)

FOREIGN PATENT DOCUMENTS

| CN | 101771762 A | 7/2010 |
|---|---|---|
| CN | 101968736 A | 2/2011 |

(Continued)

OTHER PUBLICATIONS

Martin Li˘ska; "Optimizing large applications"; Charles University in Prague Faculty of Mathematics and Physics—Department of Distributed and Dependable Systems; Mar. 27, 2014.*

(Continued)

*Primary Examiner* — Francisco J Aponte
(74) *Attorney, Agent, or Firm* — Knobbe Martens Olson & Bear LLP (57) ABSTRACT

The embodiments of the present disclosure relate to information processing technology and provide a method for data compilation capable of reducing data compilation time. The method can include traversing files to be compiled in a project to be complied to obtain all initial class files; importing all the initial class files into a specified number of intermediate class files, the specified number being smaller than a total number of the initial class files; and compiling the intermediate class files to obtain target data.

9 Claims, 4 Drawing Sheets

(58) Field of Classification Search
USPC .................................................. 717/140, 151
See application file for complete search history.

(56) References Cited

U.S. PATENT DOCUMENTS

| | | | | |
|---|---|---|---|---|
| 7,356,813 | B2* | 4/2008 | Liu ........................ | G06F 8/433 717/154 |
| 7,509,633 | B2* | 3/2009 | Nesbitt .................... | G06F 8/71 717/140 |
| 7,827,525 | B1* | 11/2010 | Navaro .................. | G06F 9/44521 717/108 |
| 7,844,960 | B2* | 11/2010 | Inglis .................. | G06F 9/45516 717/153 |
| 8,082,542 | B2* | 12/2011 | Bottomley .......... | G06F 9/45525 717/148 |
| 8,250,559 | B2* | 8/2012 | Daynes .............. | G06F 9/44521 717/166 |
| 8,458,681 | B1* | 6/2013 | Coutant ............. | G06F 8/4435 717/151 |
| 8,473,900 | B2* | 6/2013 | Frost ................ | G06F 9/44557 717/109 |
| 8,555,266 | B2* | 10/2013 | Copeland ........... | G06F 8/443 717/151 |
| 8,612,948 | B2* | 12/2013 | Kawachiya ......... | G06F 8/4441 717/148 |
| 8,789,032 | B1* | 7/2014 | Li .................. | G06F 8/443 717/154 |
| 8,875,113 | B2* | 10/2014 | Wagner .............. | G06F 9/445 717/145 |
| 8,938,728 | B2* | 1/2015 | Kawachiya ......... | G06F 9/45516 717/148 |
| 8,954,942 | B2* | 2/2015 | Krishnamurthy ..... | G06F 9/4493 717/151 |
| 9,081,583 | B2* | 7/2015 | Kee .................. | G06F 8/34 |
| 9,448,778 | B2* | 9/2016 | Doyle ................ | G06F 8/443 |
| 9,558,096 | B2* | 1/2017 | Huang ............... | G06F 11/3409 |
| 9,880,821 | B2* | 1/2018 | Gschwind ............ | G06F 8/4441 |
| 9,891,900 | B2* | 2/2018 | Goetz ................ | G06F 8/447 |
| 10,067,750 | B2* | 9/2018 | Gupta ............... | G06F 8/4441 |
| 10,223,089 | B1* | 3/2019 | Perron ................ | G06F 8/4435 |
| 10,489,131 | B2* | 11/2019 | Ishii ................. | G06F 8/54 |
| 10,521,208 | B2* | 12/2019 | Brown ................ | G06F 8/4443 |
| 2004/0221281 | A1* | 11/2004 | Suganuma ........... | G06F 8/41 717/151 |
| 2005/0155028 | A1* | 7/2005 | Park .................. | G06F 8/4441 717/166 |
| 2007/0169030 | A1* | 7/2007 | Tarditi, Jr. ........... | G06F 8/443 717/140 |
| 2011/0010696 | A1* | 1/2011 | Lobo ................. | G06F 8/4434 717/151 |
| 2014/0007062 | A1* | 1/2014 | Schmidt .............. | G06F 8/41 717/156 |
| 2014/0026127 | A1* | 1/2014 | McEwan ............. | G06F 8/37 717/146 |
| 2014/0237460 | A1* | 8/2014 | Schmidt .............. | G06F 9/3001 717/160 |
| 2015/0301807 | A1* | 10/2015 | Goetz ................ | G06F 9/443 717/140 |
| 2015/0331681 | A1* | 11/2015 | Rose ................. | G06F 8/315 717/143 |
| 2016/0062878 | A1* | 3/2016 | Westrelin ............ | G06F 9/4552 717/130 |
| 2016/0202961 | A1* | 7/2016 | Goetz ................ | G06F 8/71 717/148 |
| 2016/0357531 | A1* | 12/2016 | Trofin ............... | G06F 8/443 |
| 2017/0139694 | A1* | 5/2017 | Larin ................ | G06F 8/54 |
| 2017/0351497 | A1* | 12/2017 | Ramani ............... | G06F 8/4441 |
| 2018/0081650 | A1* | 3/2018 | Larin ................ | G06F 8/443 |
| 2018/0210718 | A1* | 7/2018 | Ishii ................. | G06F 8/443 |
| 2019/0034178 | A1* | 1/2019 | Goetz ................ | G06F 8/443 |

FOREIGN PATENT DOCUMENTS

| | | |
|---|---|---|
| CN | 102207884 A | 10/2011 |
| CN | 105335286 A | 2/2016 |
| CN | 105404794 A | 3/2016 |
| CN | 106775781 A | 5/2017 |
| CN | 107168749 A | 9/2017 |
| CN | 107506651 A | 12/2017 |
| EP | 0913769 A2 | 5/1999 |
| EP | 0913769 A3 | 12/1999 |
| EP | 3211526 A1 | 8/2017 |
| JP | 2017-204195 A | 11/2017 |
| KR | 10-2006-0092728 A | 8/2006 |

OTHER PUBLICATIONS

International Search Report; PCT/CN2018/101463; dated Nov. 21, 2018; 2 pages.
Office Action of Chinese Patent Application No. 201810113382. 7—21 pages (dated May 5, 2020).
Extended European Search Report of Patent Application No. 18903531. 4—8 pages (dated Oct. 7, 2020).
Office Action of corresponding Japanese Patent Application No. 2018-557898—8 pages (dated Mar. 17, 2020).
Office Action of Korean Patent Application No. 10-2018-7031626—5 pages (dated Feb. 28, 2020).
Horky, "Improve compilation efficiency: Unity Builds", CSDN, downloaded from <https://blog.csdn.net/HorkyChen/article/details/8753898>—8 pages (Apr. 3, 2013).
"Android, Compilation System (Android.mk File Details)", downloaded from <https://cnblogs.eom/yyxt/p/4013283.html>—38 pages (Oct. 9, 2014).

* cited by examiner

METHOD AND APPARATUS FOR DATA COMPILATION USING INTERMEDIATE CLASS FILES, ELECTRONIC DEVICE AND NON-TRANSITORY COMPUTER READABLE STORAGE MEDIUM

The present patent application is a National Phase of International Application No. PCT/CN2018/101463, filed on Aug. 21, 2018 and entitled "METHOD AND APPARATUS FOR DATA COMPILATION, ELECTRONIC DEVICE AND COMPUTER READABLE STORAGE MEDIUM," which claims priority to Chinese Patent Application No. 201810113382.7, filed on Feb. 5, 2018 and entitled "METHOD AND APPARATUS FOR DATA COMPILATION, ELECTRONIC DEVICE AND COMPUTER READABLE STORAGE MEDIUM," the entire contents of which are incorporated herein by reference.

TECHNICAL FIELD

The present disclosure relates to information processing technology, and more particularly, to a method and an apparatus for data compilation, an electronic device and a computer readable storage medium.

BACKGROUND

The C++ language has been widely used in developing various types of system software, such as operating systems, embedded systems or the like. In a classic compilation architecture, a compilation process of C++ can be basically divided into compilation pre-processing, a compilation optimization phase, an assembling process and a linking process. With continuous increases in size and complexity of a C++ program, there will be more and more files to be compiled in the C++ program and thus more and more compilation units. Since different compilation units need to be compiled individually, the above four compilation processes need to be executed repeatedly for the programs used and the files compiled in each of the compilation units, which is time-consuming.

SUMMARY

In view of the above, the embodiments of the present disclosure provide a method and an apparatus for data compilation, an electronic device and a computer readable storage medium, capable of reducing data compilation time to some extent.

In a first aspect, a method for data compilation is provided according to an embodiment of the present disclosure. The method includes: traversing files to be compiled in a project to be complied to obtain all initial class files; importing all the initial class files into a specified number of intermediate class files, the specified number being smaller than a total number of the initial class files; and compiling the intermediate class files to obtain target data.

Further to the above aspect and any of the embodiments, an embodiment is provided, in which the operation of traversing the files to be compiled in the project to be complied to obtain all initial class files includes: acquiring a file name suffix of each of the files to be compiled in the project to be complied; and selecting, from all the files to be compiled, files having their respective file name suffixes included in a set of preset name suffixes, as the initial class files.

Further to the above aspect and any of the embodiments, an embodiment is provided, in which the initial class files comprise header files and/or source files.

Further to the above aspect and any of the embodiments, an embodiment is provided, in which the operation of compiling the intermediate class files to obtain the target data includes: generating dynamic library files from the intermediate class files in accordance with a specified compilation rule; and packing the dynamic library files to obtain the target data.

Further to the above aspect and any of the embodiments, an embodiment is provided, in which the method further includes, prior to traversing the files to be compiled in the project to be complied to obtain all initial class files: acquiring duplicated data object identifiers in the project to be complied; and assigning a unique identifier to data objects having same data object identifiers.

In a second aspect, an apparatus for data compilation is provided according to an embodiment of the present disclosure. The apparatus includes: a traversing unit configured to traverse files to be compiled in a project to be complied to obtain all initial class files; an importing unit configured to import all the initial class files into a specified number of intermediate class files, the specified number being smaller than a total number of the initial class files; and a compiling unit configured to compile the intermediate class files to obtain target data.

Further to the above aspect and any of the embodiments, an embodiment is provided, in which the traversing unit includes: an acquiring module configured to acquire a file name suffix of each of the files to be compiled in the project to be complied; and a selecting module configured to select, from all the files to be compiled, files having their respective file name suffixes included in a set of preset name suffixes, as the initial class files.

Further to the above aspect and any of the embodiments, an embodiment is provided, in which the initial class files comprise header files and/or source files.

Further to the above aspect and any of the embodiments, an embodiment is provided, in which the compiling unit includes: a generating module configured to generate dynamic library files from the intermediate class files in accordance with a specified compilation rule; and a packing module configured to pack the dynamic library files to obtain the target data.

Further to the above aspect and any of the embodiments, an embodiment is provided, in which the apparatus further includes: an acquiring unit configured to acquire duplicated data object identifiers in the project to be complied; and an assigning unit configured to assign a unique identifier to data objects having same data object identifiers.

In a third aspect, an electronic device is provided. The electronic device includes a processor, a memory, a communication interface and a bus. The memory stores computer executable instructions, the processor is connected to the memory via the bus, and when the server is operating, the processor executes the computer executable instructions stored in the memory to cause the server to perform the method according to any of the embodiments in the first aspect.

In a fourth aspect, a computer readable storage medium is provided. The computer readable storage medium has a computer program stored thereon. The program, when executed by a processor, performs the method according to any of the embodiments in the first aspect.

The embodiments of the present disclosure provide a method and an apparatus for data compilation, an electronic device and a computer readable storage medium. A large number of initial class files in a project to be compiled can be integrated into a smaller number of intermediate class files which are to be compiled. Compared with the conventional solution in which a compilation process has to be performed once for each of the initial class files, the solutions according to the embodiments of the present disclosure effectively reduce the number of class files to be compiled and thus the number of compilation units, which in turn effectively reduces the compilation time required for the entire project to be compiled to some extent, though the content in one single class file may increase.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first', 'second' and 'third' may be used in the present disclosure to describe elements, the elements should not be limited to these terms. These terms are used only to distinguish the elements from each other. For example, without departing from the scope of the embodiments of the present disclosure, a first element may also be referred to as a second element. Similarly, the second element may also be referred to as the first element.

Depending on the context, the term "if" as used herein can be interpreted as "when", "in a case where", "in response to determining" or "in response to detecting . . . ". Similarly, depending on the context, the phrase "if it is determined . . . " or "if it is detected . . . (a statement of a condition or event)" can be interpreted as "when it is determined . . . ", "in response to determining", "when it is detected . . . (a statement of a condition or event)", or "in response to detecting . . . (a statement of a condition or event)".

Figure 1:
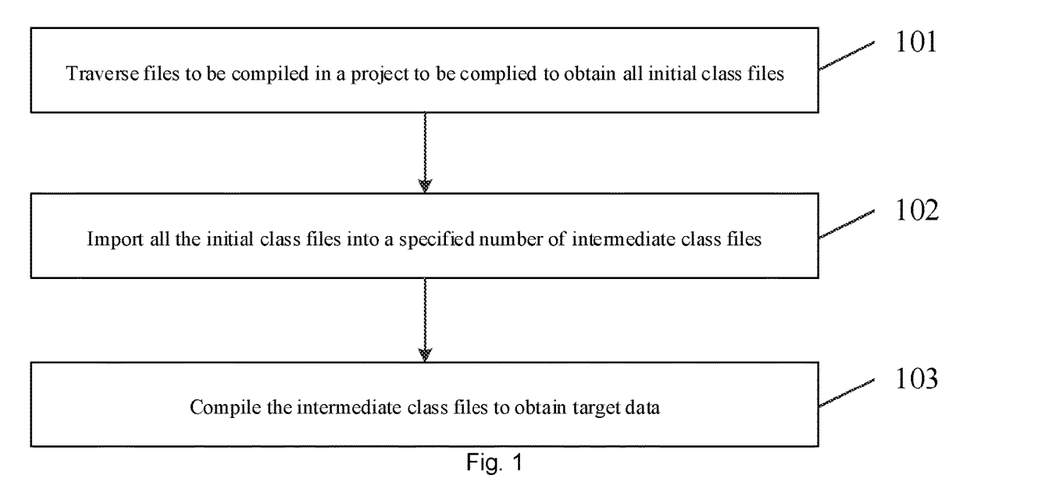
FIG. 1 is a flowchart illustrating a method for data compilation according to an embodiment of the present disclosure.

According to an embodiment of the present disclosure, a method for data compilation is provided. As shown in FIG. 1, the method includes the following steps.

At 101, files to be compiled in a project to be compiled are traversed to obtain all initial class files.

Here, in one single project to be complied, there may be a large number of files to be compiled. In an embodiment of the present disclosure, various files to be compiled can all be imported into intermediate class files. Hence, a traversing and selecting process is needed to gather all class files to be compiled in the project to be complied.

Typically, the initial class files may include header files (.h), source files (.cpp) and other possible types of files.

At 102, all the initial class files are imported into a specified number of intermediate class files. The specified number is smaller than a total number of the initial class files.

Here, an intermediate class file is a type of class file provided independently in the embodiment of the present disclosure, which may use the same file format as the initial class files, or an independently configured file format as desired.

In an embodiment of the present disclosure, only one or a several intermediate class files can be provided, which will significantly reduce the number of compilation units. Meanwhile, since the content of all the initial class files is contained in the several intermediate class files, the functions of the project to be complied will not be affected.

At 103, the intermediate class files are compiled to obtain target data.

The embodiment of the present disclosure provides a method for data compilation. A large number of initial class files in a project to be compiled can be integrated into a smaller number of intermediate class files which are to be compiled. Compared with the conventional solution in which a compilation process has to be performed once for each of the initial class files, the solution according to the embodiment of the present disclosure effectively reduces the number of class files to be compiled and thus the number of compilation units, which in turn effectively reduces the compilation time required for the entire project to be compiled to some extent, though the content in one single class file may increase.

Figure 2:
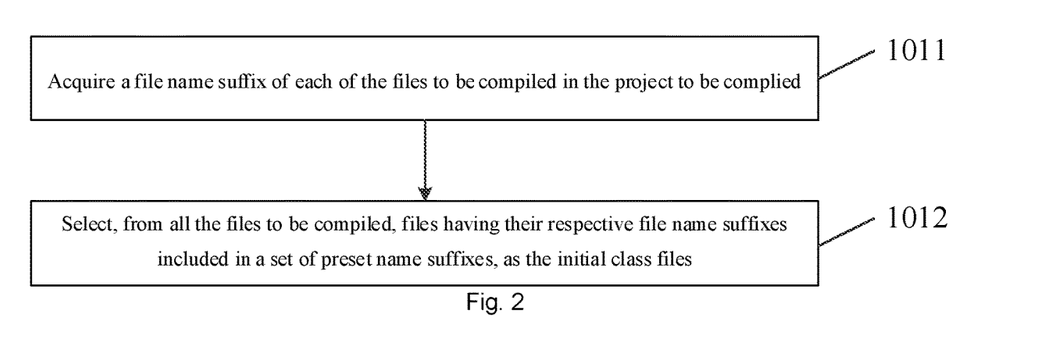
FIG. 2 is a flowchart illustrating another method for data compilation according to an embodiment of the present disclosure.

Further, in an embodiment of the present disclosure, the step 101 of traversing the files to be compiled in the project to be complied to obtain all initial class files may include the following process. As shown in FIG. 2, the process includes the following steps.

At 1011, a file name suffix of each of the files to be compiled in the project to be complied is acquired.

A file name suffix, or referred to as extended file name, can be used to identify a type of a file. For example, a class file may have a file name suffix such as ".h" or ".cpp".

A file name suffix typically follows a file name of a file and thus can be found by means of keyword matching.

At 1012, files having their respective file name suffixes included in a set of preset name suffixes are selected from all the files to be compiled, as the initial class files.

The set of preset name suffixes can be a set of preset keywords and used for recording name suffixes of various types of files that may be compiled in the project to be compiled. The keywords included in the set can be added or modified as desired.

Figure 3:
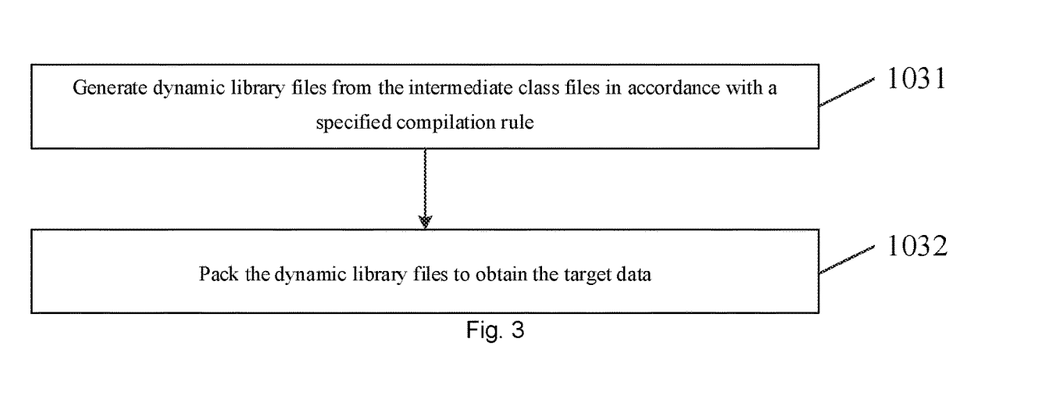
FIG. 3 is a flowchart illustrating yet another method for data compilation according to an embodiment of the present disclosure.

Further, in an embodiment of the present disclosure, the step 103 of compiling the intermediate class files to obtain the target data may include the following process. As shown in FIG. 3, the process includes the following steps.

At 1031, dynamic library files are generated from the intermediate class files in accordance with a specified compilation rule.

The specified compilation rule can be edited according to requirements in the file android.mk.

The file android.mk is typically used to describe source codes of the project to be compiled to a compilation system. The specified compilation rule defined by the file can be used in compiling the following five types of objects:

1) APK program: a typical Android program, which will be compiled and packed into an apk file.

2) JAVA library: a Java class library, which will be compiled and packed into a jar file.

3) C/C++ application program: an executable C/C++ application program.

4) C/C++ static library: a compiled and generated C/C++ static library, which will be packed into a .a file.

5) C/C++ shared library, a compiled and generated shared library (dynamic link library), which will be packed into a .so file (only the shared library can be installed/copied to a desired application software package (APK)).

In an embodiment of the present disclosure, it is desired to generate the dynamic library files (.so) for convenience in APK packing.

At 1032, the dynamic library files are packed to obtain the target data.

In an embodiment of the present disclosure, the packing can be performed by means of ant.

Figure 4:
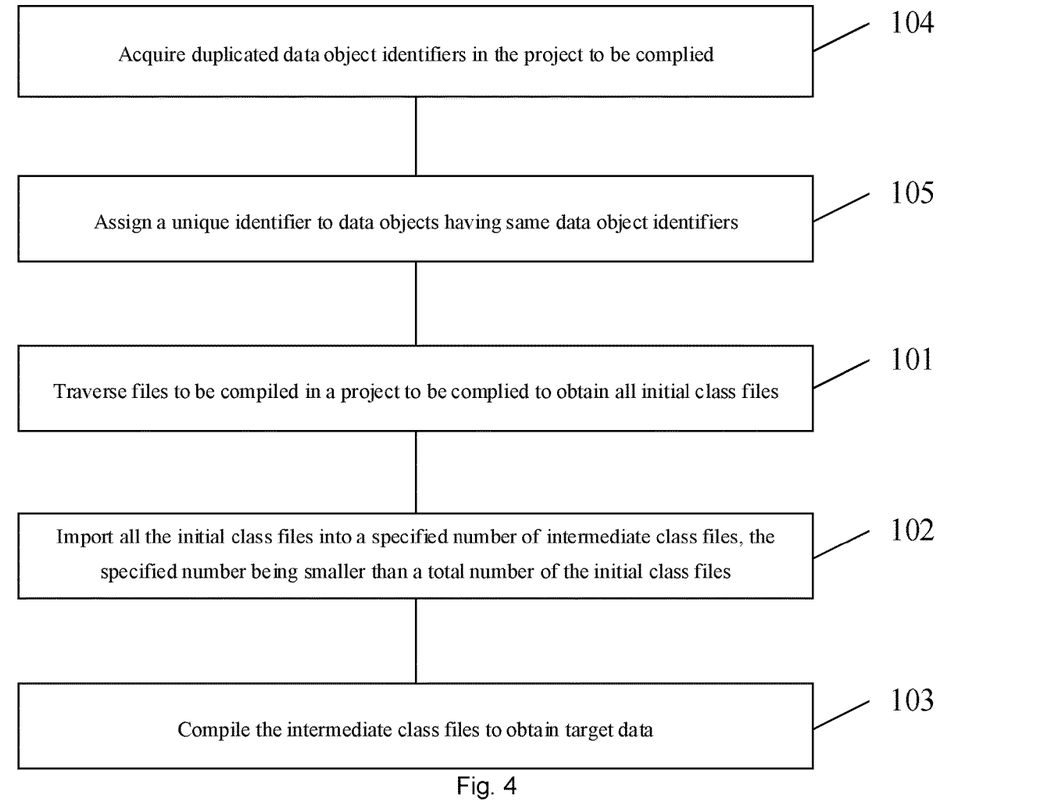
FIG. 4 is a flowchart illustrating a still another method for data compilation according to an embodiment of the present disclosure.

Further, in order to avoid errors in compiling the initial class files that have been combined into the intermediate class files, a duplication check process can be performed in advance on various data object identifiers in the initial class files. This process is shown in FIG. 4 and includes the following steps.

At 104, duplicated data object identifiers are acquired in the project to be complied.

The data object identifiers may include macro definitions used in the initial class files and all variables, such as enumerated variables, structures or single instances, that are defined outside a class and required by another class.

It is to be noted here that the duplicated data object identifiers are data object identifiers having the same names but different definitions. The duplicated data object identifiers can be located based on positions of errors reported during program compilation or in other check procedures.

At 105, a unique identifier is assigned to data objects having same data object identifiers.

Figure 5:
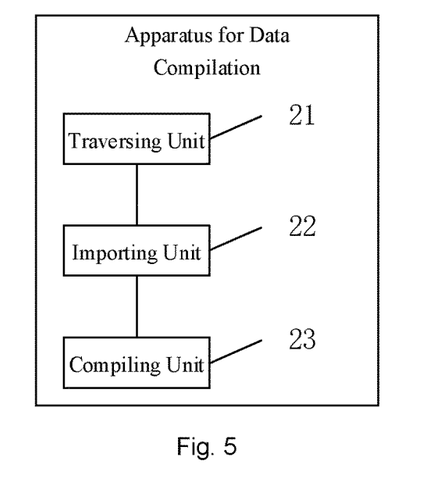
FIG. 5 is a block diagram of an apparatus for data compilation according to an embodiment of the present disclosure.

According to an embodiment of the present disclosure, an apparatus for data compilation is provided. The apparatus can be used to implement the above described method process. As shown in FIG. 5, the apparatus includes:

a traversing unit 21 configured to traverse files to be compiled in a project to be complied to obtain all initial class files;

an importing unit 22 configured to import all the initial class files into a specified number of intermediate class files, the specified number being smaller than a total number of the initial class files; and a compiling unit 23 configured to compile the intermediate class files to obtain target data.

Figure 6:
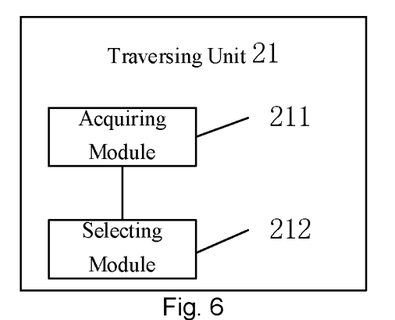
FIG. 6 is a block diagram of another apparatus for data compilation according to an embodiment of the present disclosure.

Optionally, as shown in FIG. 6, the traversing unit 21 includes:

an acquiring module 211 configured to acquire a file name suffix of each of the files to be compiled in the project to be complied; and a selecting module 212 configured to select, from all the files to be compiled, files having their respective file name suffixes included in a set of preset name suffixes, as the initial class files.

Optionally, the initial class files include header files and/or source files.

Figure 7:
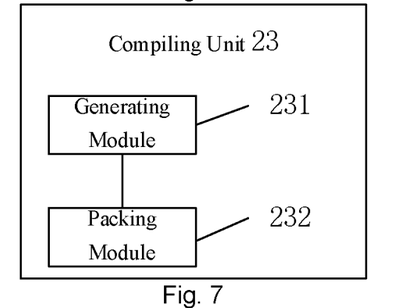
FIG. 7 is a block diagram of yet another apparatus for data compilation according to an embodiment of the present disclosure.

Optionally, as shown in FIG. 7, the compiling unit 23 includes:

a generating module 231 configured to generate dynamic library files from the intermediate class files in accordance with a specified compilation rule; and a packing module 232 configured to pack the dynamic library files to obtain the target data.

Figure 8:
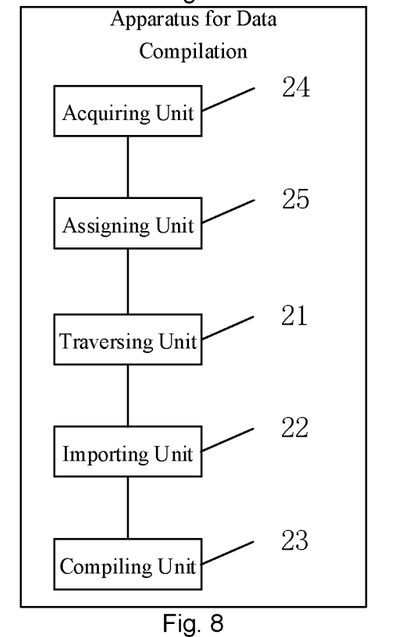
FIG. 8 is a block diagram of still another apparatus for data compilation according to an embodiment of the present disclosure.

Optionally, as shown in FIG. 8, the apparatus can further include:

an acquiring unit 24 configured to acquire duplicated data object identifiers in the project to be complied; and an assigning unit 25 configured to assign a unique identifier to data objects having same data object identifiers.

The embodiment of the present disclosure provides an apparatus for data compilation. A large number of initial class files in a project to be compiled can be integrated into a smaller number of intermediate class files which are to be compiled. Compared with the conventional solution in which a compilation process has to be performed once for each of the initial class files, the solution according to the embodiment of the present disclosure effectively reduces the number of class files to be compiled and thus the number of compilation units, which in turn effectively reduces the compilation time required for the entire project to be compiled to some extent, though the content in one single class file may increase.

Figure 9:
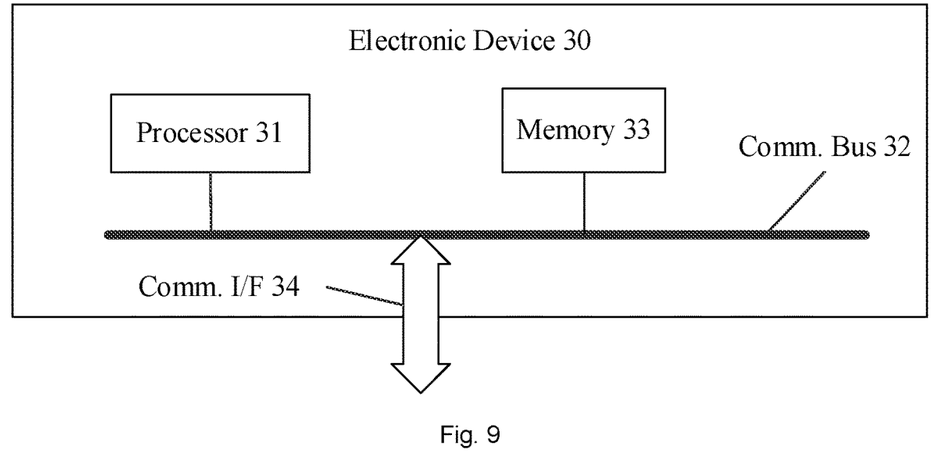
FIG. 9 is a block diagram of an electronic device according to an embodiment of the present disclosure.

According to an embodiment of the present disclosure, an electronic device 30 is provided. As shown in FIG. 9, the electronic device 30 includes at least one processor 31, a communication bus 32, a memory 33 and at least one communication interface 34.

The processor 31 can be a general purpose Central Processing Unit (CPU), a micro-processor, an Application Specific Integrated Circuit (ASIC) or one or more integrated circuits for controlling execution of a program according to the present disclosure.

The communication bus 32 can include a path on which the above components can communicate information.

The communication interface 34 can use any transceiver for communicating with other devices or communication networks, such as Ethernet, Radio Access Network (RAN), or Wireless Local Area Network (WLAN).

The memory 33 can be, but not limited to, a Read-Only Memory (ROM) or any other type of static storage device capable of storing static information and instructions, a Random Access Memory (RAN) or any other type of dynamic storage device capable of storing information and instructions, an Electrically Erasable Programmable ROM (EEPROM), a Compact Disc ROM (CD-ROM) or other optical disc memory (including CD, laser disc, optical disc, Digital Versatile Disc (DVD) or Blue-Ray Disc), a magnetic storage medium or other magnetic storage device, or any other medium capable of carrying or storing desired program codes in form of instructions or data structures and accessible by a computer. The memory can be standalone and connected to the processor via the bus, or integrated with the processor.

Here, the memory 33 stores application program codes executable by the processor 31 for performing the solutions of the present disclosure. The processor 31 executes the application program codes stored in the memory 33. When the server is running, the processor 31 executes the computer executable instructions stored in the memory 33 such that the server can: traverse files to be compiled in a project to be compiled to obtain all initial class files; import all the initial class files into a specified number of intermediate class files, the specified number being smaller than a total number of the initial class files; and compile the intermediate class files to obtain target data.

Optionally, the operation of traversing the files to be compiled in the project to be compiled to obtain all initial class files may include: acquiring a file name suffix of each of the files to be compiled in the project to be compiled; and selecting, from all the files to be compiled, files having their respective file name suffixes included in a set of preset name suffixes, as the initial class files.

Optionally, the initial class files can include header files and/or source files.

Optionally, the operation of compiling the intermediate class files to obtain the target data can include: generating dynamic library files from the intermediate class files in accordance with a specified compilation rule; and packing the dynamic library files to obtain the target data.

Optionally, prior to traversing the files to be compiled in the project to be compiled to obtain all initial class files, the processor can: acquire duplicated data object identifiers in the project to be compiled; and assign a unique identifier to data objects having same data object identifiers.

The embodiment of the present disclosure provides an electronic device. A large number of initial class files in a project to be compiled can be integrated into a smaller number of intermediate class files which are to be compiled. Compared with the conventional solution in which a compilation process has to be performed once for each of the initial class files, the solution according to the embodiment of the present disclosure effectively reduces the number of class files to be compiled and thus the number of compilation units, which in turn effectively reduces the compilation time required for the entire project to be compiled to some extent, though the content in one single class file may increase.

According to an embodiment of the present disclosure, a computer readable storage medium is provided. The computer readable storage medium has a computer program stored thereon. The program, when executed by a processor, causes the processor to perform the following method steps of: traversing files to be compiled in a project to be compiled to obtain all initial class files; importing all the initial class files into a specified number of intermediate class files, the specified number being smaller than a total number of the initial class files; and compiling the intermediate class files to obtain target data.

Optionally, the operation traversing the files to be compiled in the project to be compiled to obtain all initial class files can include: acquiring a file name suffix of each of the files to be compiled in the project to be compiled; and selecting, from all the files to be compiled, files having their respective file name suffixes included in a set of preset name suffixes, as the initial class files.

Optionally, the initial class files can include header files and/or source files.

Optionally, the operation of compiling the intermediate class files to obtain the target data can include: generating dynamic library files from the intermediate class files in accordance with a specified compilation rule; and packing the dynamic library files to obtain the target data.

Optionally, prior to traversing the files to be compiled in the project to be compiled to obtain all initial class files, the processor can: acquire duplicated data object identifiers in the project to be compiled; and assign a unique identifier to data objects having same data object identifiers.

The embodiments of the present disclosure provide a computer readable medium. A large number of initial class files in a project to be compiled can be integrated into a smaller number of intermediate class files which are to be compiled. Compared with the conventional solution in which a compilation process has to be performed once for each of the initial class files, the solution according to the embodiment of the present disclosure effectively reduces the number of class files to be compiled and thus the number of compilation units, which in turn effectively reduces the compilation time required for the entire project to be compiled to some extent, though the content in one single class file may increase.

It can be appreciated by those skilled in the art that, for the operations of the above described systems, apparatuses and units, reference can be made to the corresponding processes described in connection with the above method embodiments and details thereof will be omitted here for the sake of convenience and simplicity.

It can be appreciated from the embodiments of the present disclosure that the disclosed systems, apparatuses methods can be implemented in alternative ways. The apparatus embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, each of these units can be a separate unit, or two or more units can be integrated into one unit. Such integrated unit can be implemented in hardware, possibly in combination with software functional units.

The above integrated units, when implemented in software function units, can be stored in a computer readable storage medium. The software function units can be stored in a storage medium, which may be any of various mediums capable of storing program codes, such as a USB disk, a mobile hard disk, a Read Only Memory (ROM), a Random Access Memory (RAM), a magnetic disk or an optical disc or the like, containing instructions which cause a computer device (which can be a personal computer, a server, a network device or the like) to perform at least a portion of the steps of the methods according to the embodiments of the present disclosure.

While the preferred embodiments of the present disclosure have been described above, the scope of the present disclosure is not limited thereto. Various modifications, equivalent alternatives or improvements can be made by those skilled in the art without departing from the scope of the present disclosure. These modifications, equivalent alternatives and improvements are to be encompassed by the scope of the present disclosure.

What is claimed is:

1. A method for data compilation, comprising:
   traversing files to be compiled in a project to be compiled to obtain all initial class files, wherein the initial class files comprise header files and/or source files;
   importing all the initial class files into a specified number of intermediate class files, the specified number being smaller than a total number of the initial class files; and
   compiling the intermediate class files to obtain target data;
   wherein said compiling the intermediate class files to obtain the target data comprises:
     generating dynamic library files from the intermediate class files in accordance with a specified compilation rule; and
     packing the dynamic library files to obtain the target data,
   wherein the specified compilation rule is edited based on requirements in a file android.mk, the file android.mk is used to describe source codes of the project to be compiled to a compilation system, and the specified compilation rule defined by the file android.mk is used in compiling at least one of APK program, JAVA library, C/C++ application program, C/C++ static library, or C/C++ shared library, and
   wherein the APK program is compiled and packed into an apk file, the JAVA library that is a java class library is compiled and packed into a jar file, the C/C++ application program is an executable C/C++ application program, the C/C++ static library is a compiled and generated C/C++ static library and is packed into a .a file, and the C/C++ shared library is a compiled and generated shared library that is a dynamic link library, and is packed into a .so file.

2. The method of claim 1, wherein said traversing the files to be compiled in the project to be compiled to obtain all initial class files comprises:
   acquiring a file name suffix of each of the files to be compiled in the project to be complied; and
   selecting, from all the files to be compiled, files having their respective file name suffixes included in a set of preset name suffixes, as the initial class files.

3. The method of claim 1, further comprising, prior to traversing the files to be compiled in the project to be complied to obtain all initial class files:
   acquiring duplicated data object identifiers in the project to be complied; and
   assigning a unique identifier to data objects having same data object identifiers.

4. An electronic device, comprising a processor, a memory, a communication interface and a bus, wherein the memory stores computer executable instructions, the processor is connected to the memory via the bus, and when the electronic device is operating, the processor executes the computer executable instructions stored in the memory to cause the electronic device to:
   traverse files to be compiled in a project to be compiled to obtain all initial class files, wherein the initial class files comprise header files and/or source files;
   import all the initial class files into a specified number of intermediate class files, the specified number being smaller than a total number of the initial class files; and
   compile the intermediate class files to obtain target data;
   wherein said compiling the intermediate class files to obtain the target data comprises:
     generating dynamic library files from the intermediate class files in accordance with a specified compilation rule; and
     packing the dynamic library files to obtain the target data,
   wherein the specified compilation rule is edited based on requirements in a file android.mk, the file android.mk is used to describe source codes of the project to be compiled to a compilation system, and the specified compilation rule defined by the file android.mk is used in compiling at least one of APK program, JAVA library, C/C++ application program, C/C++ static library, or C/C++ shared library, and
   wherein the APK program is compiled and packed into an apk file, the JAVA library that is a java class library is compiled and packed into a jar file, the C/C++ application program is an executable C/C++ application program, the C/C++ static library is a compiled and generated C/C++ static library and is packed into a .a file, and the C/C++ shared library is a compiled and generated shared library that is a dynamic link library, and is packed into a .so file.

5. The electronic device of claim 4, wherein said traversing the files to be compiled in the project to be complied to obtain all initial class files comprises:
   acquiring a file name suffix of each of the files to be compiled in the project to be complied; and
   selecting, from all the files to be compiled, files having their respective file name suffixes included in a set of preset name suffixes, as the initial class files.

6. The electronic device of claim 4, the processor executes the computer executable instructions stored in the memory to cause the electronic device to, prior to traversing the files to be compiled in the project to be complied to obtain all initial class files:
   acquire duplicated data object identifiers in the project to be complied; and
   assign a unique identifier to data objects having same data object identifiers.

7. A non-transitory computer readable storage medium having a computer program stored thereon, the program, when executed by a processor, causes the processor to:

traverse files to be compiled in a project to be complied to obtain all initial class files, wherein the initial class files comprise header files and/or source files;

import all the initial class files into a specified number of intermediate class files, the specified number being smaller than a total number of the initial class files; and compile the intermediate class files to obtain target data;

wherein said compiling the intermediate class files to obtain the target data comprises:

generating dynamic library files from the intermediate class files in accordance with a specified compilation rule; and packing the dynamic library files to obtain the target data, wherein the specified compilation rule is edited based on requirements in a file android.mk, the file android.mk is used to describe source codes of the project to be compiled to a compilation system, and the specified compilation rule defined by the file android.mk is used in compiling at least one of APK program, JAVA library, C/C++ application program, C/C++ static library, or C/C++ shared library, and wherein the APK program is compiled and packed into an apk file, the JAVA library that is a java class library is compiled and packed into a jar file, the C/C++ application program is an executable C/C++ application program, the C/C++ static library is a compiled and generated C/C++ static library and is packed into a .a file, and the C/C++ shared library is a compiled and generated shared library that is a dynamic link library, and is packed into a .so file.

8. The non-transitory computer readable storage medium of claim 7, wherein said traversing the files to be compiled in the project to be complied to obtain all initial class files comprises:

acquiring a file name suffix of each of the files to be compiled in the project to be complied; and selecting, from all the files to be compiled, files having their respective file name suffixes included in a set of preset name suffixes, as the initial class files.

9. The non-transitory computer readable storage medium of claim 7, the program further causes the processor to, prior to traversing the files to be compiled in the project to be complied to obtain all initial class files:

acquire duplicated data object identifiers in the project to be complied; and assign a unique identifier to data objects having same data object identifiers.

* * * * *